(No Model.) 2 Sheets—Sheet 1.
L. MIDDLETON.
WATER WHEEL.
No. 427,885. Patented May 13, 1890.
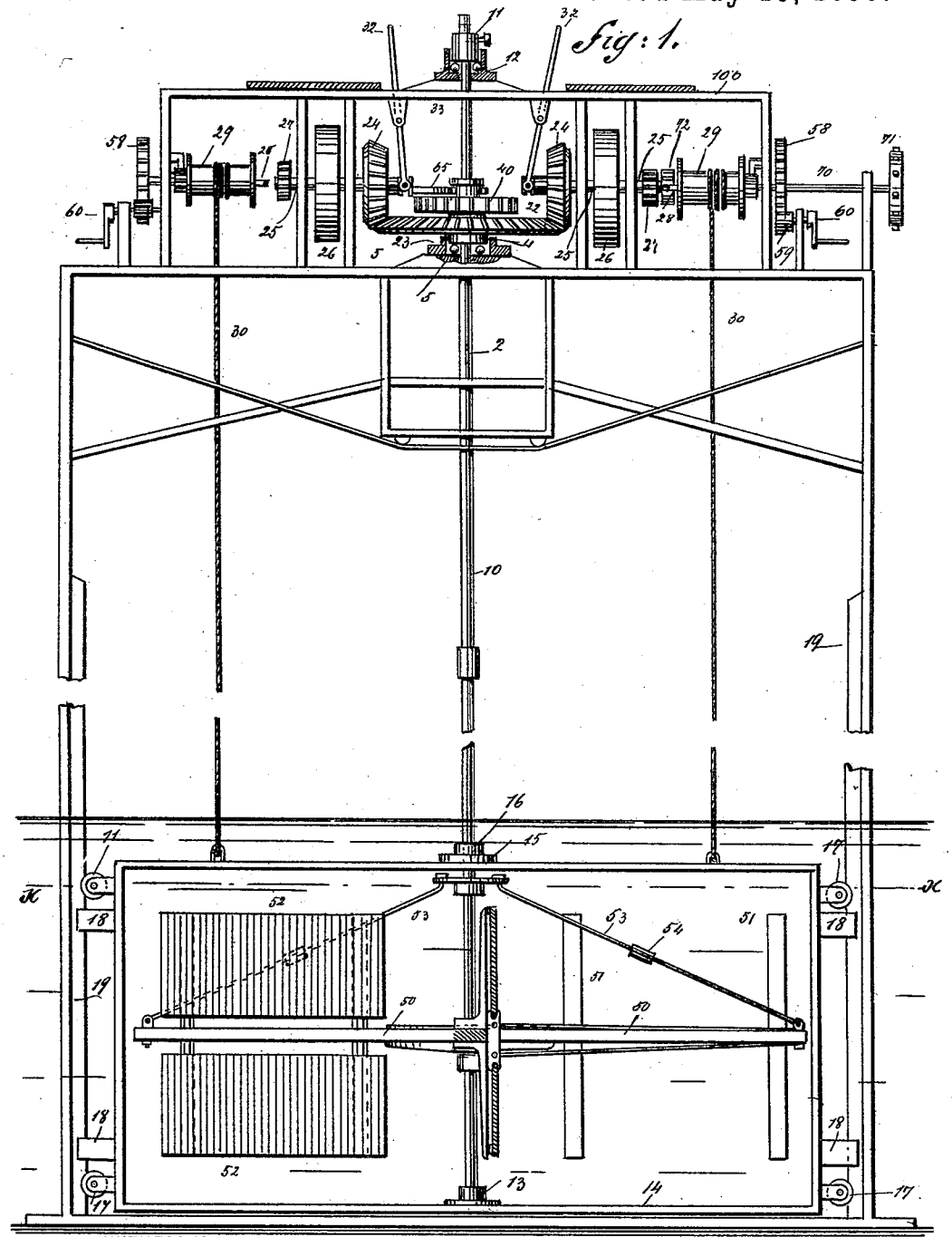
Fig: 1.
WITNESSES: Chas. Nida, C. Sedgwick
INVENTOR: L. Middleton
BY Munn & Co.
ATTORNEYS.

(No Model.) 2 Sheets—Sheet 2.
L. MIDDLETON.
WATER WHEEL.
No. 427,885. Patented May 13, 1890.
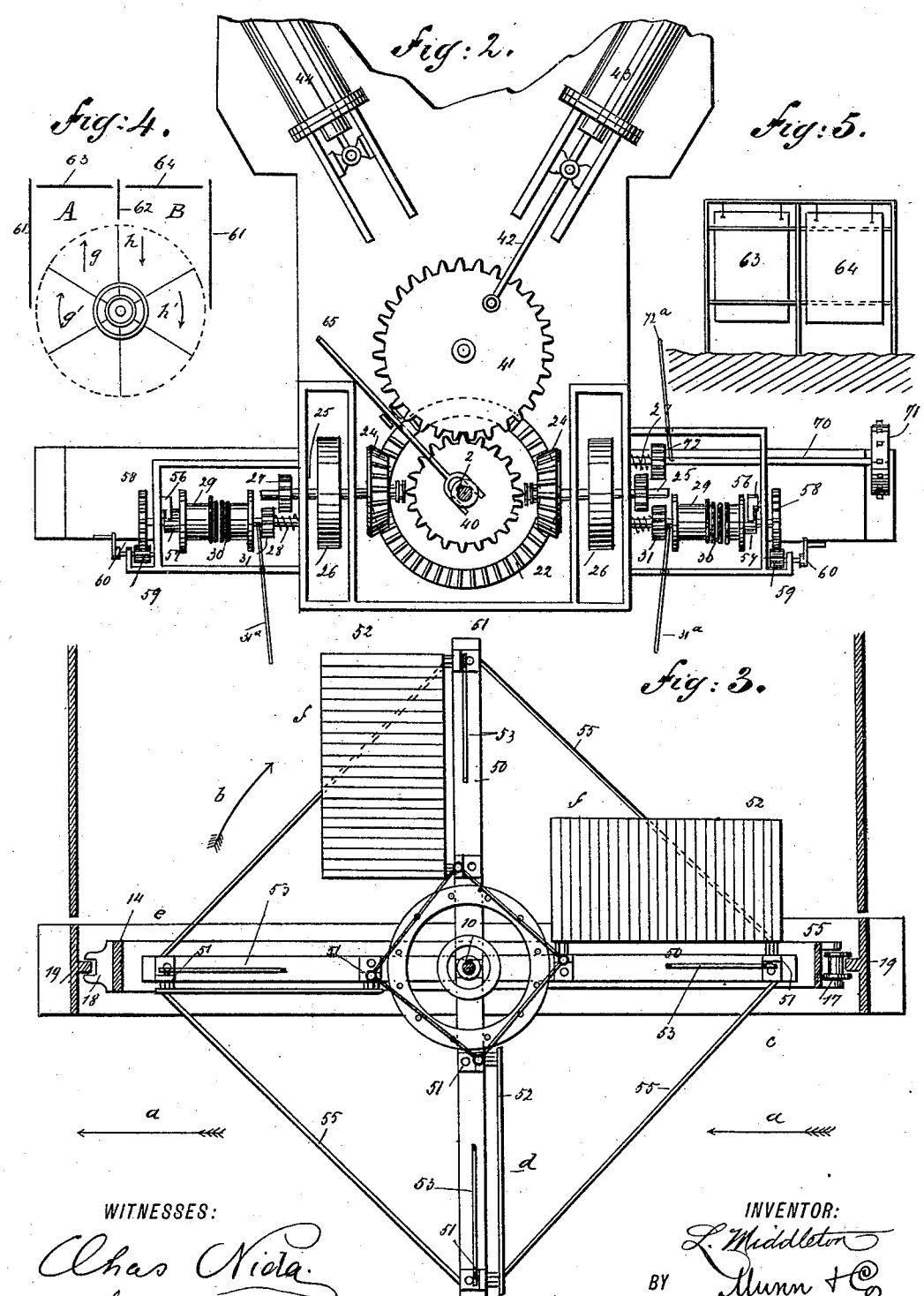

UNITED STATES PATENT OFFICE.

LEE MIDDLETON, OF CLARKSVILLE, MISSOURI.

WATER-WHEEL.

SPECIFICATION forming part of Letters Patent No. 427,885, dated May 13, 1890.

Application filed October 18, 1889. Serial No. 327,414. (No model.)

*To all whom it may concern:*

Be it known that I, LEE MIDDLETON, of Clarksville, in the county of Pike and State of Missouri, have invented a new and Improved Water-Wheel, of which the following is a full, clear, and exact description.

This invention relates to a novel form of water-wheel, the object of the invention being to improve the construction illustrated, described, and claimed in my prior application, Serial No. 312,527, which was filed in the Patent Office of the United States on the 29th day of May, 1889.

Reference is to be had to the accompanying drawings, forming a part of this specification, in which similar figures and letters of reference indicate corresponding parts in all the views.

Figure 1 is a partly-sectional side view of my improved water-wheel and the attachments employed in connection therewith. Fig. 2 is a plan view of the wheel connections, parts being broken away and the flooring removed. Fig. 3 is a sectional plan view on line $xx$ of Fig. 1. Fig. 4 is a diagrammatical view of the arrangement employed when the wheel is mounted in tide-water, and Fig. 5 is a view of the gates employed when the wheel is mounted in tide-water.

In the drawings, 10 represents the main shaft of the machine, which carries a collar 11, that rides upon an anti-friction bearing 12, such bearing being carried by the main frame 100. The lower end of the shaft 10 is stepped at 13, the step 13 being carried by a wheel-frame 14, which frame carries an anti-friction bearing 15, that is borne upon by a collar 16, said collar being carried by the shaft 10. The frame 14 is provided with grooved wheels 17 and guides 18, such wheels and guides riding upon vertical ways 19, that are carried by the frame 100.

The upper portion of the shaft 10 is formed with a feather 2, which rides in a groove formed in the hub 4 of a gear 22, the hub 4 normally resting upon the balls 5 of an anti-friction bearing 23. The gear 22 engages gears 24, carried by shafts 25, said gears being splined to the shaft to be shifted into or out of engagement with the gear 22, and to bring about this shifting of the gears 24, I provide levers 32, that are fulcrumed upon standards carried by a flooring 33, that is arranged as shown in Fig. 1. The shafts 25 carry pulleys 26 and pinions 27.

Just beyond the shafts 25, I mount shafts 28, which carry drums 29, and upon the drums 29 are coiled chains or ropes 30, that extend downward and are connected to the frame 14. In order that the drums 29 may be turned to wind up the chains or ropes and thus raise the frame 14, I provide the shafts 28 with pinions or gears 31, splined to the shafts, and provide levers 31ª, engaging the grooved hubs of the gears, so that when the gears 31 are moved inward the teeth of the pinions or gears 27 will be brought into engagement with the teeth of the pinions or gears 31.

Above the gear 22, I mount a gear 40, which may be thrown into engagement with a crank-gear 41, that is arranged as best shown in Fig. 2. To this gear 41, I connect a pitman 42, which pitman in turn may be connected with a pump 43 or with an air-compressor 44, the cylinders of the compressor and pump being arranged as shown in Fig. 2.

The wheel proper consists of a number of radially-extending arms 50, any number of such arms being employed. These arms carry vertical braces 51, which serve as stops for hinged leaves 52. The arms 50 are braced by means of rods 53, that are provided with turn-buckles or tighteners 54. In addition to the rods 53, I provide bracing-rods 55, which connect the ends of the arms 50, the rods being in such position that when the leaves 52 are folded down they will rest upon such rods, as represented in Fig. 3.

In operation I will suppose that the current is running in the direction indicated by the arrows marked $a$ in Fig. 3. Then as the wheel revolves in the direction of the arrow $b$ the leaves (which are held apart by the brace-rods) will, when they come to about the point marked $c$, be opened, and will assume the position in which they are shown at $d$—that is, the leaves will be folded back until they rest against the vertical stops 51—but as the arms reach the point marked $e$ the leaves will fold down to the position in which they are shown at $f$ in Fig. 3, thus offering the least resistance to the current. When it is desired to raise the wheel out of the current, the levers 31ª are thrown so that the pinions or gears 27 will engage the pinions or gears 31, and a rotary motion will thus be imparted to the drums 29 and the cords or chains 30 will be wound thereon, all retrograde motion of the drums being prevented by pawls 56, which engage ratchets 57, carried by the drum-shafts. In certain instances it might be desirable to raise the wheel by hand, and to this end I provide the drum-shafts with large gears 58, that are engaged by pinions 59, carried by crank-shafts 60, the arrangement being such that by turning the crank-shafts 60 the drum-shafts will be turned and the cords or chains 30 wound thereon.

If the wheel is to be operated by tide-power, I would mount the wheel in a pen made up of side barriers 61 and a central barrier 62, thus forming ways A and B, that are controlled by gates 63 and 64, the gate 63 opening outward, as will be seen from an inspection of Fig. 5, while the gate 64 opens inward, so that when the tide is moving in the direction of the arrow marked $g$ the wheel will revolve in the direction of the arrow $g'$, while when the tide is moving in the direction of the arrow marked $h$ the wheel will revolve in the direction of the arrow marked $h'$.

When it is desired to drive machinery through the medium of belts, such belts are run upon the pulleys 26 and carried thence to pulleys mounted on a counter-shaft; but when either the pump 43 or the compressor 44 are to be run the belts are disconnected and the gear 40 lowered to place, so that it will engage the gear 41, the lowering of the gear 40 being brought about through the medium of a lever 65, that is arranged substantially in the manner shown in Fig. 1.

Under certain circumstances it might be desirable to employ the power generated by the wheel through the medium of a chain-wheel, and to this end I mount a shaft 70, which carries a chain-wheel 71 and a pinion or gear 72, the pinion or gear 72 being arranged so that it may be engaged by the pinion 27 of one of the shafts 25, said pinion 72 being splined to its shaft and arranged to be brought into engagement with the pinion 27 by the lever 72ª.

By the arrangement of gearing shown and described one or both shafts 25 can be thrown into or out of gear with the wheel 22.

Having thus described my invention, I claim as new and desire to secure by Letters Patent—

1. In a water-wheel, the combination, with a sliding frame and a water-wheel mounted therein and having its shaft prolonged and provided with a gear-wheel on the upper end thereof, of a drum mounted above the sliding frame and having a gear-wheel on the end of its shaft, a rope leading from the drum to the frame, and a counter-shaft provided with a gear-wheel at each end adapted to mesh with the gear-wheels of the wheel and drum shafts, substantially as herein shown and described.

2. In a water-wheel, the combination, with a sliding frame and a water-wheel mounted therein and having its shaft prolonged and provided at at its upper end with a gear-wheel, of a drum mounted above the sliding frame, a gear-wheel mounted to slide on the shaft of the drum, a rope leading from the drum to the sliding frame, a counter-shaft provided with a gear-wheel at each end, and a pivoted lever for sliding the gear-wheel on the drum-shaft to throw the said gear-wheels in and out of gear, substantially as herein shown and described.

3. In a water-wheel, the combination, with a sliding shaft, a frame secured to the shaft, and a wheel mounted on the shaft within the frame, of a gear-wheel on the upper end of the said shaft, a gear-wheel on a counter-shaft meshing with the gear-wheel on the sliding shaft and from which the machine to be operated is driven, means for throwing said gear-wheels in and out of gear, a drum-gearing for driving the drum from the counter-shaft, and a connection between the frame and drum, substantially as herein shown and described.

4. In a water-wheel, the combination, with a sliding shaft, a frame secured to the lower end of the shaft, and a wheel mounted on the shaft within the frame and having folding leaves, of a gear-wheel on the upper end of the sliding shaft and through which said shaft slides, a horizontal shaft provided with a gear-wheel at each end, one of said gear-wheels meshing with the gear-wheel on the sliding shaft, a second horizontal shaft provided with a gear-wheel meshing with the gear-wheel on the first-named horizontal shaft and with a drum, a rope connected to the drum and to the frame in which the wheel is mounted, and means for throwing the gear-wheels of the horizontal shafts in and out of gear, substantially as herein shown and described.

LEE MIDDLETON.

Witnesses:
MARCUS M. LYTER,
JAMES A. GRIFFITH.